United States Patent
Hummert et al.

(10) Patent No.: US 7,033,108 B1
(45) Date of Patent: Apr. 25, 2006

(54) TURF PLAYING SURFACE AERATION AND DRAINAGE SYSTEM

(75) Inventors: George T. Hummert, Aiken, SC (US); Fredrick O. Hartenstein, Martinez, GA (US)

(73) Assignee: SubAir Systems, LLC, Graniteville, SC (US)

( * ) Notice: Subject to any disclaimer, the term of this patent is extended or adjusted under 35 U.S.C. 154(b) by 0 days.

(21) Appl. No.: 11/094,995

(22) Filed: Mar. 31, 2005

Related U.S. Application Data

(60) Provisional application No. 60/662,913, filed on Mar. 17, 2005.

(51) Int. Cl.
*E02B 11/00* (2006.01)
*F16K 31/12* (2006.01)

(52) U.S. Cl. .................. 405/37; 405/36; 405/43; 405/46; 137/78.2; 137/236.1

(58) Field of Classification Search .......... 405/37, 405/43, 46, 51, 52; 137/78.1, 78.2, 236.1, 137/561 R
See application file for complete search history.

(56) References Cited

U.S. PATENT DOCUMENTS

| | | | |
|---|---|---|---|
| 3,425,555 A * | 2/1969 | Ridgeway | 405/128.45 |
| 3,772,857 A | 11/1973 | Jackson | |
| 3,835,500 A | 9/1974 | Zamboni | |
| 3,908,385 A * | 9/1975 | Daniel et al. | 405/37 |
| 4,704,047 A * | 11/1987 | Oldfelt et al. | 405/37 |
| 4,948,294 A * | 8/1990 | Mercier | 405/37 |
| 5,219,243 A * | 6/1993 | McCoy | 405/43 |
| 5,350,251 A | 9/1994 | Daniel | |
| 5,387,057 A | 2/1995 | DeLoach | |
| 5,433,759 A | 7/1995 | Benson | |
| 5,507,595 A | 4/1996 | Benson | |
| 5,590,980 A * | 1/1997 | Daniel | 405/36 |
| 5,622,450 A | 4/1997 | Grant, Jr. | |
| 5,944,444 A * | 8/1999 | Motz et al. | 137/78.2 |
| 6,018,909 A | 2/2000 | Potts | |
| 6,149,345 A | 11/2000 | Atkins | |
| 6,364,628 B1 | 4/2002 | Potts et al. | |
| 2003/0207440 A1 | 11/2003 | Smith | |

FOREIGN PATENT DOCUMENTS

JP 03245888 * 11/1991 .................. 405/36

* cited by examiner

*Primary Examiner*—Jong-Suk (James) Lee
(74) *Attorney, Agent, or Firm*—McNair Law Firm, PA; Seann P. Lahey; Cort Flint

(57) ABSTRACT

A perforated pipe network beneath a playing surface. A blower connected to the pipe network drawing an air flow through the pipe network to create a vacuum. A drain pipe connecting to the pipe network. An air/water separator connected upstream of the blower for separating water from the air flow prior to entering the blower and channeling the water into the drain pipe for discharge. A flow control unit having a unit inlet connected to the drain pipe downstream of the air/water separator and a unit outlet discharging water to a drain outlet. The flow control unit blocking air flow through the unit inlet into the drain pipe when the blower is in the vacuum mode, and opening the unit inlet when a waterhead buildup at the unit inlet exceeds the vacuum level established by the blower to discharge water through the drain outlet.

21 Claims, 5 Drawing Sheets

TURF PLAYING SURFACE AERATION AND DRAINAGE SYSTEM

CROSS REFERENCE TO RELATED APPLICATION

This application claims priority from a provisional application filed Mar. 17, 2005 under Ser. No. 60/662,913 having the same title.

BACKGROUND OF THE INVENTION

1) Field of the Invention

The present invention relates generally to subsurface aeration and drainage systems, and more particularly, to a combination pressure and vacuum valve assembly for maintaining atmospheric isolation of the subsurface system while separating water from air and draining the water out of the system.

2) Description of Related Art

Subsurface systems have been developed for removing water and aerating turf on sports fields and golf greens. A typical system is comprised of a network of interconnected drainage pipe located beneath a region of turf and a blower connected in such a manner that a partial vacuum or differential pressure can be created in the drainage network. Water drains from the network through one or more "outfall" pipes that transport water to an external discharge location. For instance, many greens have several outfalls that are defined by the location of drainage pipes beneath the green. Greens with several surface grades sloping away from a ridge, for example, are often plumbed with an outfall for each sloped region.

In the vacuum mode of operation, when water is removed as air is drawn down through a region of turf, water becomes entrained in the air stream and the mixture of air and water moves toward the blower. A device called a "water separator" is normally located between the drain pipe network and the blower, and it functions to separate the air/water mixture into two separate streams comprising an air stream to the blower and a water stream into the drainage outfall. There are several reasons why it is desirable to keep water from reaching the blowers. First, since the blowers are normally designed to move air, not heavy water particles, both efficiency and effectiveness are reduced when significant quantities of water become mixed in the air stream. Secondly, water tends to collect at low elevation regions or "saddles" in the pipes which reduces the effective cross section of pipe, thereby reducing air flow through the pipes and ultimately from the turf.

The blower system has a second mode of operation where pressure rather than a partial vacuum is applied beneath the green to cause air to flow up through the turf thereby aerating the root zone and moderating temperatures on the surface from the air stream that has been tempered by the substrate beneath the green.

In either the vacuum or the pressure mode, the pipe network beneath the region being treated must be isolated from atmospheric pressure. Without such isolation, there would be little or no pressure differential and the air path would tend to go between outfalls and the blower rather than through the turf to the blower.

Various forms of separators and valves have been developed to break the air-water mixture into two streams of flow and at the same time provide atmospheric isolation between the vacuum or pressure created by the blower and the discharge outfall. One such conventional separator consists of a barrel-chamber configured such that the water/air steam entering the chamber encounters a baffle that causes water to drop gravitationally to the bottom while air continues moving above the water level to a port near the top of the chamber that is connected to the blower. An important feature of conventional separators is a "J trap" pipe configuration connected to the bottom of the barrel and through which the water discharges from the barrel into the outfall pipe. The J trap serves to isolate the pressure or vacuum in the separator from the outfall pipe. As water accumulates in the vault and in the J trap beneath, it builds up enough pressure head to overcome the vacuum created by the blower at which point water flows out of the J trap, through the drain line to the discharge outfall. An example of such a system can be found in U.S. Pat. No. 5,507,595.

Proper function of the J trap depends upon sufficient water being held to counteract pressure or partial vacuums created by the blower in the separator. If the system is in the pressure mode, for instance, and the pressure level is 20 inches Water Gage (WG), then the out leg of the "J" trap must be greater than 20 inches to counter the blower pressure. In the vacuum mode the longer down leg must be approximately 20 inches longer than the outgoing leg in order to develop enough pressure to permit water to escape from the outgoing leg without filling the separator barrel. When the two modes of operation are taken into account, pressure and vacuum, the trap must be greater than 48 inches deep to properly isolate the blower vacuum pressure beneath the green from the atmospheric pressure in the drain line. The overall depth of the excavation required to install and cover a separator plus a J trap is approximately eight (8) feet.

Normally only one outfall of a multiple-outfall drain network beneath a green is connected through a separator to a blower. Additional or multiple outfalls in the same network must also be isolated from atmospheric pressure in order for the proper pressure or vacuum levels to be established within the drain-pipe network beneath the turf. Conventionally, J traps are also used for this purpose, and a golf green with, for example, three outfalls will typically employ three J traps with one located on a separator unit and one on each of the remaining two outfalls.

However, there are several problems with this type of arrangement. More specifically, during installation, deep excavation is required to install a separator with J trap or a J trap on a multiple outfall green. Installation crews can lay pipe and make reliable connections much more expeditiously where deep excavations are not required. Deep excavations require specialized equipment, such as backhoes and the like, and equipment operators that are not needed for shallow trenching. The cost and time of installation increases when deep excavations are required.

Further, with regards to reliability, J traps, by design, have deep curved channels through which the water travels to the discharge outfall. These deep regions tend to collect sediment and become constricted or clogged flow channels. J traps must be inspected frequently, especially after new green installations, where "fines" tend to wash out of the turf and settle in J traps. Another problem is caused when the surrounding soil shifts after a J trap is installed and connected to a separator barrel. The relative displacement of the two tends to break or crack the J-trap fitting thereby permitting additional sediment and fines to enter the trap or to render the J-trap inoperable.

Accordingly, it is an object of the present invention to provide a turf playing surface aeration and drainage systems that does not require deep excavation for installation and which maintains atmospheric isolation of the system while separating water from air and draining the water out of the system.

SUMMARY OF THE INVENTION

The above objective is accomplished according to an embodiment of the present invention by providing a turf playing surface aeration and drainage system including a perforated pipe network installed beneath the surface, and a blower operatively associated with the pipe network for establishing an air flow in the pipe network. A drain pipe is connecting to the perforated pipe network for channeling water out of the pipe network. The blower has a vacuum mode in which the air flow creates a vacuum in the pipe network. An air/water separator is connected upstream of the blower for separating water from the air flow prior to entering the blower in the vacuum mode and channeling the water into the drain pipe for discharge through a drain outlet. A flow control unit having a unit inlet is connected to the drain pipe downstream of the air/water separator and a unit outlet discharging water to the drain outlet. The flow control unit has a vacuum mode of operation blocking air flow through the unit inlet into the drain pipe when the blower is in the vacuum mode, and opening the unit inlet in the vacuum mode when a waterhead buildup within the drain pipe at the unit inlet exceeds the vacuum level established by the blower at the air/water separator to discharge water through the drain outlet.

In a preferred embodiment of the invention, the flow control unit includes a vacuum section having a first valve element movable between a first position blocking air and water flow through the unit inlet in the vacuum mode, and a second position allowing discharge of water to the drain outlet at a prescribed waterhead buildup. In a further advantageous embodiment, the first valve element includes a flapper carried at the unit inlet for sealing off the unit inlet in the vacuum mode and opening at a prescribed waterhead buildup level to discharge the water through the unit outlet.

In a further embodiment, the blower may be constructed and arranged with a pressure mode of operation in which the air flow is directed into the perforated pipe network and up to the turf playing surface. Advantageously, the flow control unit includes a pressure section having a second valve element movable to a first position in the pressure mode blocking the air flow through the unit outlet to prevent the air flow from exiting through the drain outlet, and the second valve element movable to a second position in the vacuum move allowing water to exit through the unit outlet. In a preferred embodiment, the second valve element includes a float ball directed by the air flow in the pressure mode into the unit outlet to block air flow through the unit outlet, and wherein the float ball is caused to float out of the unit outlet during the vacuum mode by water entering the flow control unit to allow water to exit through the unit outlet and be discharged through the drain outlet.

In a further advantageous embodiment, a water bypass channel is included in the unit outlet for discharging water to the drain outlet during the pressure mode when the second valve element is in the first position.

Further, the invention includes sloping the drain pipe downward from the air/water separator to position the flow control unit at a lower elevation than the separator to promote water drainage to the drain outlet and establish a prescribed waterhead buildup. In a preferred embodiment, the grade of slope of the drain pipe between the air/water separator and the flow control unit is generally between 5% and 40% depending on the length of the drain pipe.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
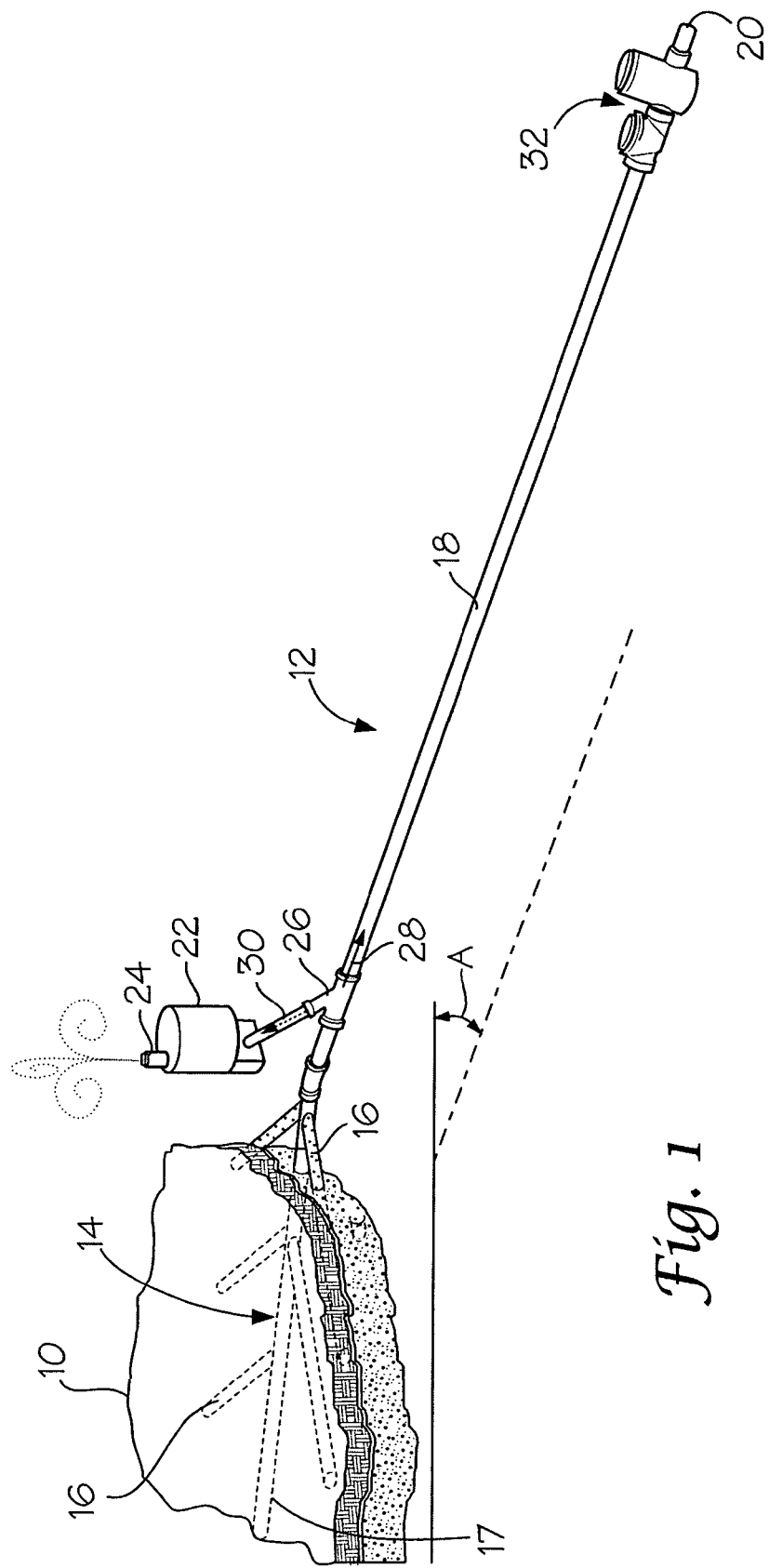
FIG. 1 is a plan view showing an aeration and drainage system for a turf playing surface according to the present invention.

With reference to the drawings, the invention will now be described in more detail. Referring to FIG. 1, a turf playing surface, designated generally as 10, is shown having an aeration and drainage system, designated generally as 12, for controlling water drainage from the playing surface, as well as aerating the playing surface to promote turf growth and maintenance.

Aeration and drainage system 12 includes a fluid flow network, designated generally as 14, having a plurality of perforated pipes 16 and a manifold pipe 17 installed beneath playing surface 10 through which an air flow passes for aerating and removing water from the playing surface. Fluid flow network 14 further includes a drain pipe 18 for channeling the water to a drain outlet 20, which typically may empty the water into a collection pond.

A blower 22 is operatively connected in fluid communication with fluid flow network 14 for creating an air flow 30 through the flow network, and in particular, through the perforated pipes, which may be selectively a vacuum air flow 30a, or a pressure air flow 30b. Blower 22 has a vacuum mode of operation which draws air flow 30a through fluid flow network 14, which is then vented through an above ground vent 24. Air flow 30a creates a vacuum in fluid flow network 14 to draw air and water down through the playing surface and the perforated pipes to provide a desired drainage or aeration effect on the turf playing surface. In a further embodiment, blower 22 may be constructed and arranged with a pressure mode of operation in which air flow 30a is reversed and pressure air flow 30b is directed into fluid flow network 14 where it exits out perforated pipes 16 and travels up to turf playing surface 10, which is useful for aeration of the turf root system and temperature control of the turf. Alternatively, the system can be constructed and arranged to operate exclusively in a pressure mode, or exclusively in a vacuum mode and is not restricted to being operatable in both a vacuum and pressure mode, although the dual mode embodiment is most advantageous.

Figure 2:
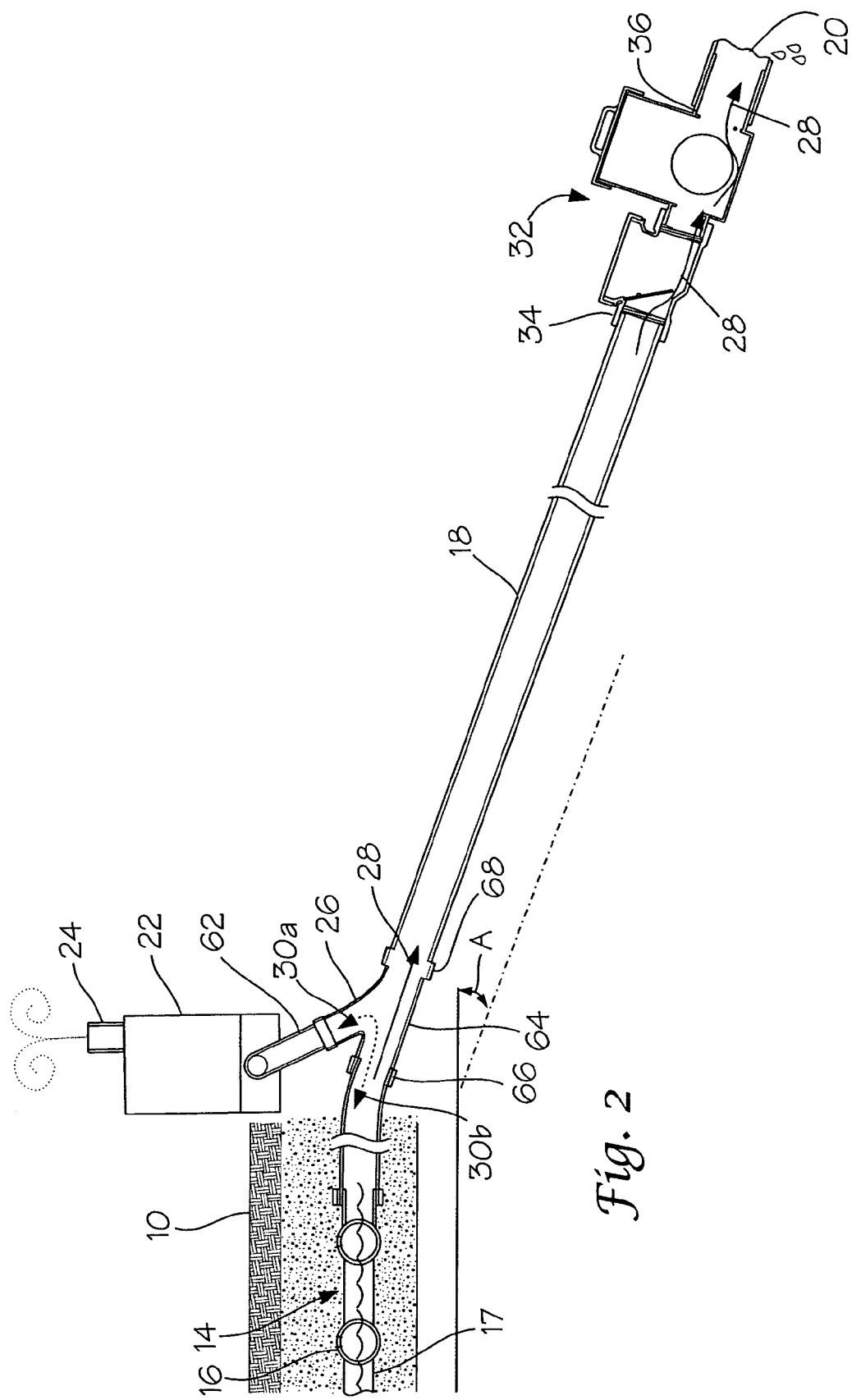
FIG. 2 is an enlarged view of a distributed air/water separator and flow control unit according to the present invention.

As best shown in FIG. 2, an air/water separator 26 is connected to fluid flow network 14 upstream of blower 22 for separating water, designated by reference arrow 28, from air flow 30 prior to the air flow entering blower 22 in vacuum mode. The water is channeled into drain pipe 18 for discharge through drain outlet 20, as is described in detail herein below. Removing the water from the air flow to the blower reduces wear and tear on the blower components and results in a more efficient air flow in the system. When blower 22 is operating in pressure mode, air flow is directed down drain pipe 18 in addition to perforated pipes 16. In either vacuum or pressure mode, the air flow will travel through the path of least resistance. Accordingly, if drain pipe 18 is open ended, when the blower draws a vacuum, it will simply suck air up drain pipe 18 and vent it out vent 24, drawing very little if any air down through the perforated pipes. Also, in pressure mode, air will primarily exit out the drain pipe if not controlled to direct the air up and out of perforated pipes 16.

Advantageously, referring to FIG. 2, a flow control unit, designated generally as 32, is provided to maintain atmospheric isolation of the fluid flow network by preventing air intake and exit through drain pipe 18, while further allowing for the discharge of water through drain outlet 20. Flow control unit 32 includes a unit inlet 34 connected to drain pipe 18 downstream of air/water separator 26. A unit outlet 36 is provided for connection to additional drain pipe or to drain outlet 20 for discharging water from drain pipe 18.

Figure 3A:
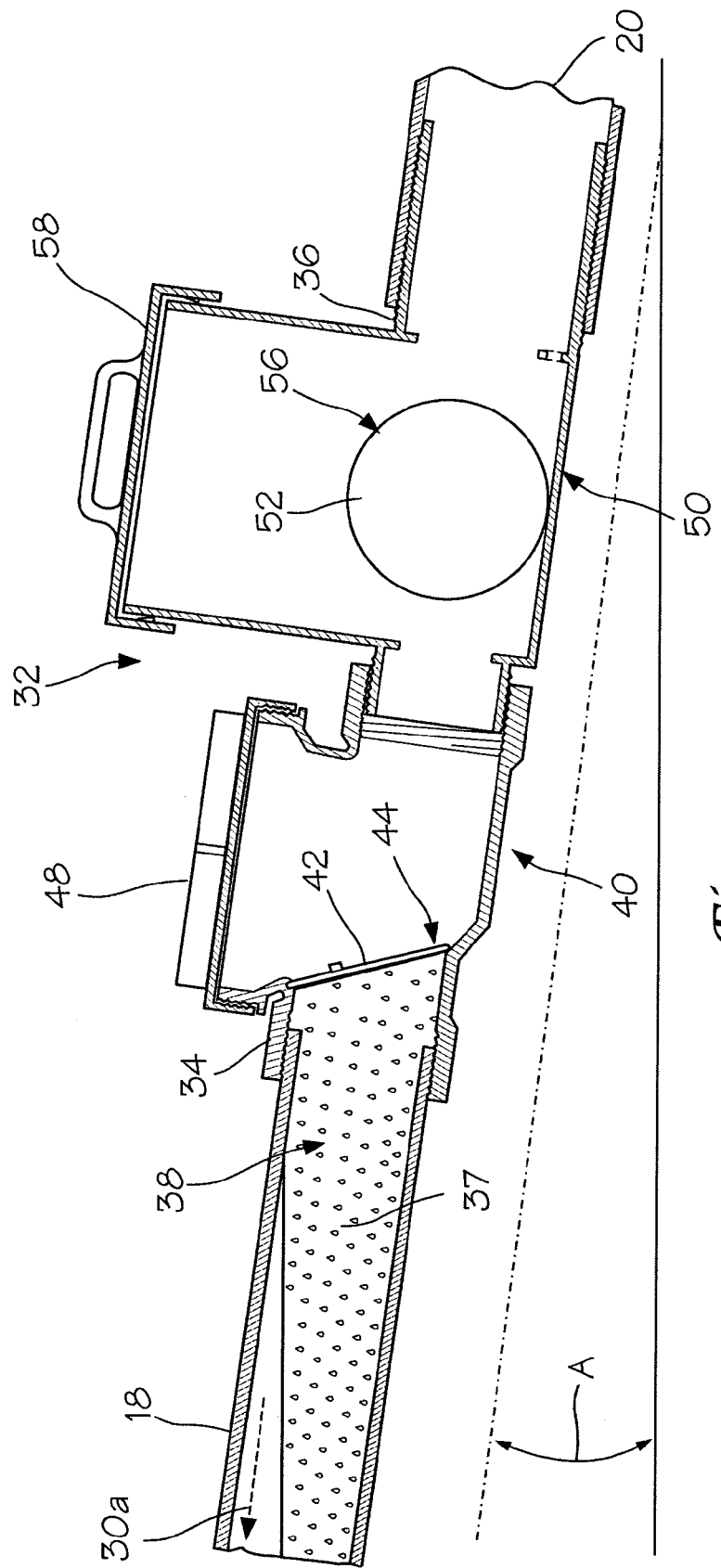
FIG. 3a is a detailed view of the flow control unit operating in a vacuum mode creating a waterhead buildup according to the present invention.
Figure 3B:
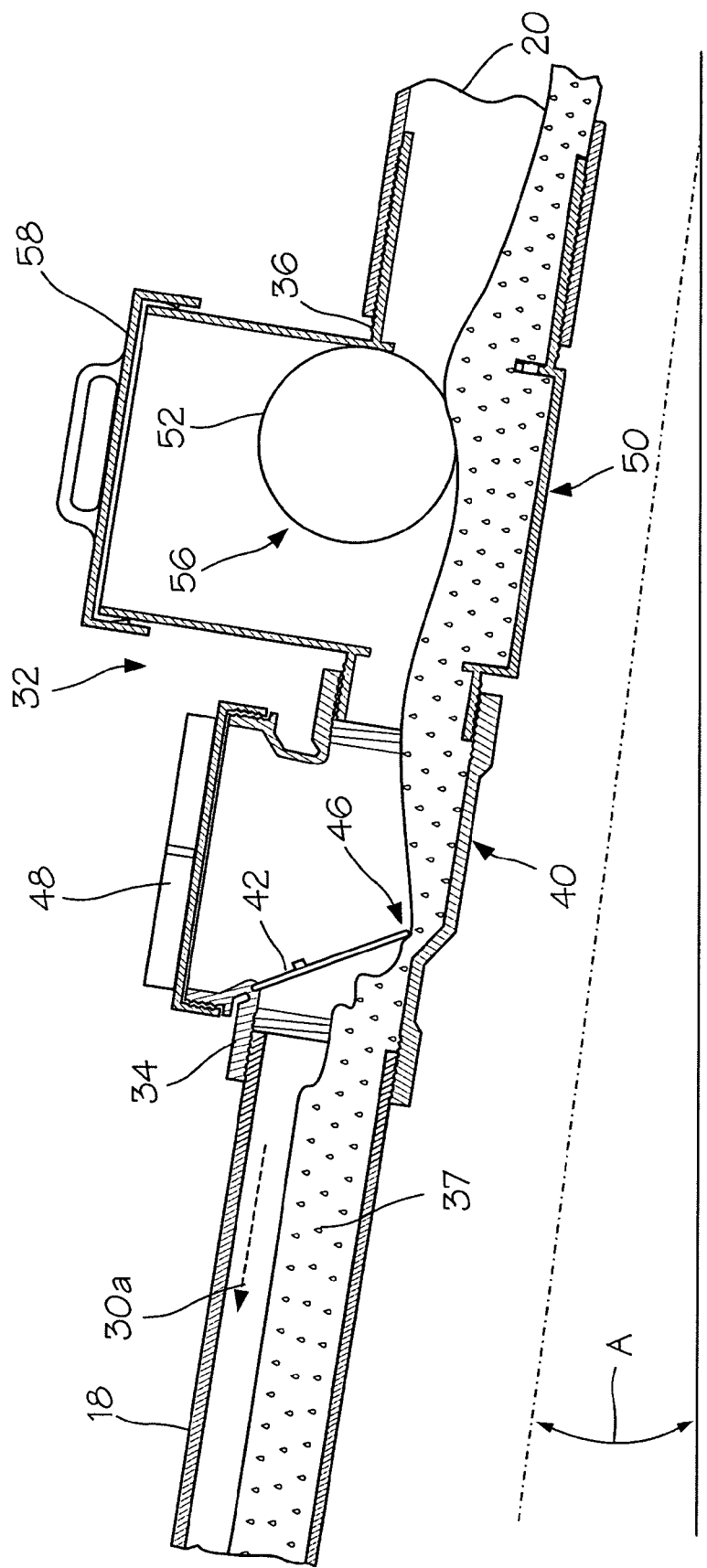
FIG. 3b is a detailed view of the flow control unit of FIG. 3a in a vacuum mode of operation in which the waterhead buildup is relieved according to the present invention; and, FIG. 3c is a detailed view of the flow control unit of FIG. 3a in a pressure mode of operation.

Referring to FIGS. 3a and 3b, flow control unit 32 has a vacuum mode of operation blocking air flow 30a from drawing additional air inward through unit inlet 34 into drain pipe 18 when blower 22 is operating in vacuum mode. Unit inlet 34 only opens during vacuum mode operation when water 37 builds up to create a waterhead, designated generally as 38, within drain pipe 18 at unit inlet 34, best shown in FIG. 3a. Once the waterhead exceeds the force of the vacuum established by blower 22 within the fluid flow network, and particularly at air/water separator 26, flow control unit 32 open unit inlet 34 and water 37 passes through the control unit and is discharged through drain outlet 20, as best shown in FIG. 3b. After the waterhead buildup is relieved flow control unit 32 closes unit inlet 34 to prevent air intake. Unit inlet 32 opens only to the extend water forces it way through unit inlet 32 as a result of the waterhead pressure on unit inlet 32. Accordingly, little to no air is able to enter the fluid flow network through unit inlet 32, which thus maintains the vacuum established by blower 22.

In a preferred embodiment of the invention, flow control unit 32 includes a vacuum section, designated generally as 40, having a first valve element 42 movable between a first position, designated generally as 44 and shown in FIG. 3a, closing off unit inlet 34 and blocking air and water flow through unit inlet 34 in vacuum mode. Referring to FIG. 3b, first valve element 42 further has a second position, designated generally as 46, which opens inlet 34 allowing discharge of water to the drain outlet at a prescribed waterhead buildup. Once waterhead buildup 38 is partially relieved, the vacuum force of air flow 30a will cause first valve element 42 to close unit inlet 34 again in order to prevent air intake up drain pipe 18 in an automatic manner as a result of pressure differentials between fluid flow network 14 and the surrounding atmosphere. In a preferred embodiment, first valve element 42 includes a flapper, also designated 42, pivotally carried at unit inlet 34 for sealing off the unit inlet in the vacuum mode to create waterhead 38, and opening at a prescribed waterhead buildup level to discharge the water through unit outlet 36. For maintenance purposes, a removable lid 48 is carried by vacuum section 40 of flow control unit 32 to provide access for cleaning and maintenance.

Figure 3C:
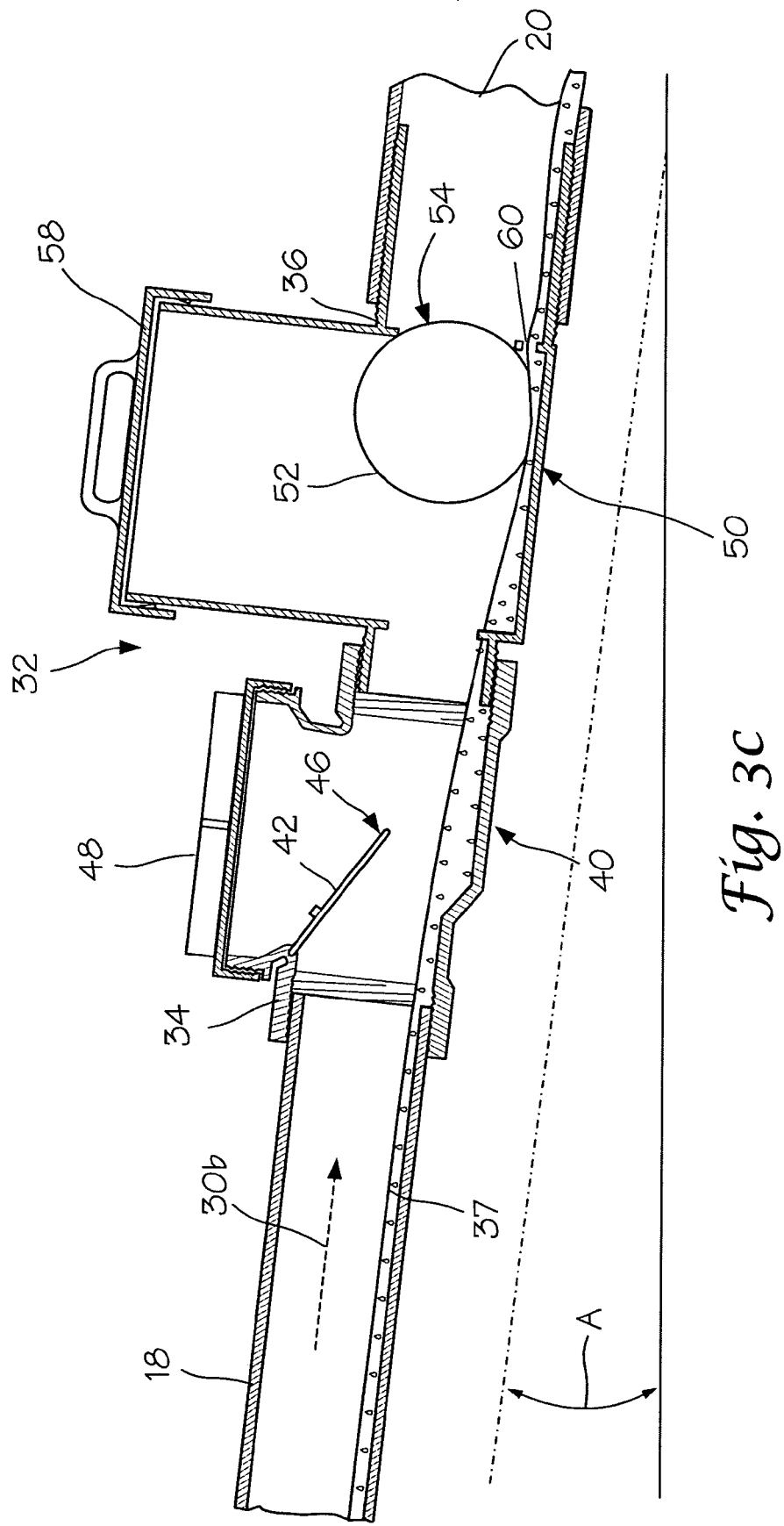

In a further advantageous embodiment, referring to FIG. 3c, flow control unit 32 may also include a pressure section, designated generally as 50. When blower 22 is operating in pressure mode, air flow 30b is directed down through drain pipe 18. To prevent the air flow from exiting, a second valve element 52 is provided which is movable to a first position, designated generally as 54, in the pressure mode which blocks air flow 30b for exiting through unit outlet 36 to prevent the air flow from exiting through drain outlet 20. Second valve element 52 is also movable to a second position, designated generally as 56, shown in both FIGS. 3a and 3b. Second valve element 52 is moved to second position 56 in the vacuum mode of operation for blower 22 and flow control unit 32 which allows water 37 to exit through unit outlet 36. In the illustrated embodiment, second valve element 52 includes a float ball, also designated 52. Float ball 52 is directed by the air flow in the pressure mode into unit outlet 36 to block air flow through the unit outlet. However, when blower 22 is switched to vacuum mode, float ball is caused to float out and away from of unit outlet 36 by water entering the flow control unit to allow the water to exit through unit outlet 36 and be discharged through the drain outlet, as best shown in FIG. 3b. For maintenance purposes, a removable lid 58 is carried by pressure section 50 of flow control unit 32 to provide access for cleaning and maintenance.

Referring to FIG. 3c, in a further advantageous embodiment, a water bypass channel 60 is included in the unit outlet for discharging water to the drain outlet during the pressure mode when second valve element 52 is in the first position 54 to block air flow from exiting unit outlet 36. Because residual water may enter fluid flow network 14 during pressure mode operation, it is advantageous to allow the water to drain from the system to prevent deposit buildup and other maintenance issues. However, when second valve element 52 is in first position 54, it blocks both air and water from entering unit outlet 36. Accordingly, water bypass channel 60 allows small amounts of water to be diverted around second valve element 52 for drainage, but does not allow a significant portion of air to exit in order to maintain pressure within fluid flow network 14.

Referring to FIGS. 1 and 2, drain pipe 18 is sloped downward from the air/water separator to position flow control unit 32 at a lower elevation than air/water separator 26 to promote water drainage to drain outlet 20 and establish a prescribed waterhead buildup in combination with first valve element 42. In a preferred embodiment, the grade, designated as reference angle A, of slope of drain pipe 18 between air/water separator 26 and flow control unit 32 is generally between 5% and 40% depending on the length of the drain pipe, as detailed in table 1 below.

TABLE 1

Pipe length between air/water separator and flow control unit (for a blower generating 24 inch WG vacuum)

| Grade (% slope) | Pipe length |
| --- | --- |
| 5% | 100 ft |
| 10% | 50 ft |
| 20% | 25 ft |
| 30% | 17 ft |
| 40% | 13 ft |

Accordingly, aeration and drainage system 12 of the present invention preferably includes the combination of a vacuum section 40 and a pressure section 50 each having a valve element 42, 52 that together selectively and automatically, without mechanical actuation, prevent the discharge or intake of air flow and water into fluid flow network 14. This system eliminate the need for deep excavations, external controls, and is less prone to clogging than conventional drainage systems, such as the "J" trap discussed above.

Vacuum section 40 may include a backwater or check valve that permits water and air flow in one direction only. As discussed above, the preferred embodiment employs a flapper 42 that opens in one direction when the air flow or water pressure from the source, drain pipe 18, is greater than the pressure of the destination, drain outlet 20. Pressure differences cause the flapper to open and close without the aid of springs or other mechanical means.

With regards to pressure section 50, it may be constructed and arranged as a "T" fitting containing a float ball 52 with unit outlet 36 having a prescribed opening such that in the pressure mode float ball 52 is constrained by pressure of air, and in some instances water, to block the discharge opening. In the vacuum mode of operation for blower 22, water 37 entering the device causes the ball to float up and away from the opening, thereby enabling unrestricted flow of water through the unit outlet 36.

An important feature of second valve element 52 in pressure section 50 is the size and shape of unit outlet 36. When float ball is used as second valve element 52, it is pushed into the opening by the combination of air and any standing water pressure behind it. The normal buoyant pressure on float ball 52 is disrupted by the absence of hydraulic pressure in the opening, and the ball has a tendency to become lodged in the opening by the combination of air and water pressure behind it. Therefore, the opening must be large enough to permit full flow in the vacuum mode, yet small enough to reduce the tendency to get stuck from pressure differences in the pressure mode. In a preferred embodiment, using a ball of 5.9" diameter, together with an opening for unit outlet 36 of 3" in diameter provides sufficient buoyancy to overcome a pressure head of 9" WG (Water Gage). Preferably, the center line of the opening matches that of the ball to ensure the best fit.

Another consideration was the removal of water that may flow into the drainage system while the system is in the pressure mode. As discussed above, a small water bypass channel is therefore included in unit outlet 36. It has been tested that a bypass opening of 0.5" radius discharges water at sufficient rate to preclude backup in the pressure section while at the same time preventing significant air flow loss when no water is present in flow control unit 32. Tests yielded bypass flow typically less than 15% off the main flow.

When the two sections 40, 50 are connected in series, water and air can pass freely in one direction, but not the other. The two sections may be located adjacent to each other or separated by an interconnecting section of pipe. Alternatively, the sections may be formed together in a single unit containing both first and second valve elements 42 and 52.

This dual valve system can be used in conjunction with appropriate drainage piping to eliminate the traditional air/water separator and "J" trap configuration. This dual valve arrangement enables the construction of a distributed air/water separator that makes use of the slope or grade of the region between turf playing surface 10 and drain outlet 20 to accumulate a waterhead sufficient to counteract the vacuum mode negative pressure to discharge water while under vacuum.

Essentially, the system is comprised of three functional sections that are connected together in a relatively shallow trench running from the end of perforated pipes 16 toward drain outlet 20. Going from the turf playing surface toward the drain outlet, the three sections are: 1) air/water separator 26, 2) drain pipe 18, and 3) flow control unit 32.

Air water separator 26 includes a "Y" shaped fitting oriented along the fall line (or down-slope) with one leg 61 oriented in a generally vertical position. The vertical leg is connected to blower 22 by an air line 62, while the other leg 64 is connected to the perforated pipes 16 at an upper inlet 66, and connected to drain pipe 18 at a lower outlet 68.

Since a waterhead must be developed between air/water separator 26 and flow control unit 32, the length of pipe required depends upon the slope of ground in which drain pipe 18 is installed, as set forth in table 1 above. A steep grade requires less pipe and a shallow grade requires more to produce a prescribed waterhead buildup to overcome the vacuum pressure generated by a given blower.

Generally, for a SubAir 7.5 HP blower manufactured by SubAir, Inc., of Aiken, S.C., the vacuum level is in the range of 20 to 24 inches WG and, therefore, the elevation drop from air/water separator 26 to flow control unit 32 must be greater than 24 inches. However, it is preferred that 36 inches be provided in this case to ensure proper operation of flow control unit 32. For a SubAir Portable Air Force-1 blower unit, the vacuum level is up to 45 inches WG, and the corresponding recommended elevation drop is 60 inches (5 feet).

In the pressure mode, pressure section 50 of flow control unit 32 restricts air flow to a fraction of the total flow coming from blower 22, yet it provides a small bypass 60 for water flow in case water drains from the playing surface while in the pressure mode.

The system of the present invention may also be used as a stand-alone device to isolate multiple drain outlets from atmospheric pressure, thereby enabling vacuum/pressure in the drainage pipes to be controlled by the blower. A turf playing surface, such as a golf green, may have several drain outlets that are defined by the location of the drainage pipes (perforated pipes 16) beneath the green for a given slope on the green. Greens with several sloping grades away from a ridge, for instance, are often plumbed having drainage pipes with a drain outlet for each sloping region. In such cases the system must be installed in such a manner as to take the specific drainage configuration into account. There are several possibilities, namely, a continuous, interconnected aeration and drainage system beneath the green where a vacuum or pressure on one drain outlet causes vacuum and pressures throughout the entire pipe network. In this case, air/water separator 26 and blower 22 may be connected to one of the drainage outlets 20 or even to a clean-out port provided for the system. Any other drain outlets need to have a flow control unit 32 connected between the perforated pipes 16 and the drain outlet location such that vacuum and pressure levels generated by blower 22 are isolated from the atmosphere surrounding the fluid flow network as described herein.

While a preferred embodiment of the invention has been described using specific terms, such description is for illustrative purposes only, and it is to be understood that changes and variations may be made without departing from the spirit or scope of the following claims.

What is claimed is:

1. A turf playing surface aeration and drainage system including a perforated pipe network installed beneath the surface, and a blower operatively associated with said pipe network for establishing an air flow in the pipe network, said system comprising:
a drain pipe connecting to said perforated pipe network for channeling water out of said pipe network;
said blower having a vacuum mode in which said air flow creates a vacuum in said pipe network;
an air/water separator connected upstream of said blower for separating water from the air flow prior to entering said blower in said vacuum mode and channeling the water into said drain pipe for discharge through a drain outlet;
a flow control unit having a unit inlet connected to said drain pipe downstream of said air/water separator and a unit outlet discharging water to said drain outlet;
said flow control unit having a vacuum mode of operation blocking air flow through said unit inlet into said drain pipe when said blower is in said vacuum mode; and,
said flow control unit opening said unit inlet in said vacuum mode when a waterhead buildup within said drain pipe at said unit inlet exceeds the vacuum level established by said blower at said air/water separator to discharge water through said drain outlet.

2. The system of claim 1 wherein said flow control unit includes a vacuum section having a first valve element movable between a first position blocking air and water flow through said unit inlet in said vacuum mode, and a second position allowing discharge of water to said drain outlet at a prescribed waterhead buildup.

3. The system of claim 2 wherein said first valve element includes a flapper carried at said unit inlet for sealing off said unit inlet in said vacuum mode and opening at a prescribed waterhead buildup level to discharge the water through said unit outlet.

4. The system of claim 2 wherein said blower has a pressure mode of operation in which said air flow is directed into the perforated pipe network and up to the turf playing surface.

5. The system of claim 4 wherein said flow control unit includes a pressure section having a second valve element movable to a first position in said pressure mode blocking said air flow through said unit outlet to prevent said air flow from exiting through said drain outlet, and said second valve element movable to a second position in said vacuum move allowing water to exit through said unit outlet.

6. The system of claim 1 wherein said blower has a pressure mode of operation in which said air flow is directed into the perforated pipe network and up to the turf playing surface.

7. The system of claim 6 wherein said flow control unit includes a pressure section having a second valve element movable to a first position in said pressure mode blocking said air flow through said unit outlet to prevent said air flow from exiting through said drain outlet, and said second valve element movable to a second position in said vacuum move allowing water to exit through said unit outlet.

8. The system of claim 7 wherein said second valve element includes a float ball directed by said air flow in said pressure mode into said unit outlet to block air flow through said unit outlet, and wherein said float ball is caused to float out of said unit outlet during said vacuum mode by water entering said flow control unit to allow water to exit through said unit outlet and be discharged through said drain outlet.

9. The system of claim 7 including a water bypass channel in said unit outlet for discharging water to said drain outlet during said pressure mode when said second valve element is in said first position.

10. The system of claim 1 wherein said drain pipe is sloped downward from said air/water separator to position said flow control unit at a lower elevation than said separator to promote water drainage to said drain outlet and establish a prescribed waterhead buildup.

11. The system of claim 10 wherein the grade of slope of said drain pipe between said air/water separator and said flow control unit is generally between 5% and 40% depending on the length of said drain pipe.

12. A turf playing surface aeration and drainage system including a plurality of perforated pipes installed beneath the playing surface through which an air flow passes for aerating and removing water from the playing surface and a manifold pipe interconnecting the perforated pipes for channeling air and water out of said perforated pipes for drainage, and a blower operatively associated with said perforated pipes having a vacuum mode of operation for establishing said air flow to create a vacuum in said manifold and perforated pipes, said system comprising:
a water separation and drainage network disposed at a relatively shallow depth underground having a functional length over which water separation and drainage effectively occur;
an air/water separator included in separation and drainage network operatively connected to said manifold pipe for separating water from said air flow prior to said blower;
an elongated drain pipe included in said separation and drainage network connected to said air/water separator sloping downwardly from said air/water separator for channeling the water to a drain outlet for discharge and establishing a water pressure within said drain pipe; and,
a flow control unit having a unit inlet and a unit outlet, said control unit being connected to said drain pipe downstream of said air/water separator for controlling the buildup of water pressure within said drain pipe at said unit inlet; said flow control unit having a first valve element movable in said vacuum mode between a first position for blocking air flow in a first direction through said fluid control unit whereupon a waterhead having increasing pressure is created at said unit inlet, and a second position for discharging water through said unit inlet and outlet in a second direction opposite said first direction when said water pressure exceeds the vacuum force in said drain line.

13. The system of claim 12 wherein said air/water separator includes a y-fitting having an upwardly inclined leg connected to said blower and another leg connected to said manifold pipe and said drain pipe.

14. The system of claim 12 wherein said first valve element includes a flapper carried generally at a unit inlet of said flow control unit for sealing off said unit inlet in said vacuum mode, said flapper valve opening at a prescribed waterhead pressure and closing when water pressure drops below said prescribed pressure.

15. The system of claim 12 wherein said blower has a pressure mode of operation in which said air flow is directed into said perforated pipes and up through the turf playing surface.

16. The system of claim 15 wherein said flow control unit includes a second valve element having a first position in said pressure mode blocking said air flow through said unit inlet and outlet to prevent said air flow through said drain outlet, and said second valve element having a second position in said vacuum mode allowing water to discharge through said unit inlet and outlet.

17. The system of claim 16 including a water bypass channel in said unit outlet for discharging water which enters said flow control unit in said pressure mode to said drain outlet when said second valve element is in said first position blocking said unit outlet.

18. The system of claim 12 wherein said drain pipe is sloped downward from said air/water separator at a grade generally between 5% and 40% depending on the length of said drain pipe to promote water drainage to said drain outlet and establish a prescribed waterhead pressure.

19. A method for aerating turf and removing water on a playing surface wherein a fluid flow network having perforated pipes is installed below the playing surface, and a drain pipe is connected to the flow network, comprising the steps of:

drawing a vacuum on said fluid flow network to draw air and water from the surface into said perforated pipes;

separating the air and water drawn into said flow network;

directing the water into said drain pipe for channeling the water through a drain outlet;

blocking air flow into said drain pipe when said vacuum is established in said perforated pipes to prevent air from entering said drain pipe through said drain outlet; and allowing water flow through said drain pipe when a waterhead pressure in said drain pipe exceeds the vacuum force on said network to discharge water through said drain outlet.

20. The method of claim 19 including the step of pressurizing said fluid flow network to force air through said perforated pipes up to said playing surface.

21. The method of claim 20 including the step of blocking air flow out of said drain pipe through said drain outlet to maintain pressurization of said fluid flow network.

* * * * *